United States Patent [19]
Hill

[11] 3,967,920
[45] July 6, 1976

[54] HORTICULTURE SPRAYING SYSTEMS
[76] Inventor: Raymond G. Hill, P. O. Box 1043, Victoria, Tex. 77901
[22] Filed: May 29, 1975
[21] Appl. No.: 581,905

Related U.S. Application Data
[62] Division of Ser. No. 502,074, Aug. 30, 1974, Pat. No. 3,894,690.

[52] U.S. Cl. .................................. 417/63; 417/313
[51] Int. Cl.² .......................................... F04B 21/00
[58] Field of Search ..................... 417/63, 313, 319; 116/73, 152; 222/39

[56] References Cited
UNITED STATES PATENTS
2,078,486   4/1937   Eastman ............................. 222/39

Primary Examiner—William L. Freeh
Assistant Examiner—G. P. LaPointe
Attorney, Agent, or Firm—Donald H. Fidler

[57] ABSTRACT

This horticulture system mixes and meters two liquids in precise and determinable quantities and provides for appropriate control of the liquid flow. A water tank and a chemical tank are respectively coupled by constant volume pumping means to a mixing and discharge nozzle means. The pumps are driven by a common motor to obtain a predetermined flow ratio. A pressure responsive bypass valve means is connected between the output side of the pumps and the respective tanks to provide an automatic bypass of the respective liquids to their respective tanks in response to the opening and closing of the discharge nozzle. The bypass function of the bypass valve is controlled by pressure generated in the system. Bell means are provided to respond to the presence of flowing chemicals in the chemical output line to indicate that a metered volume or flow of chemicals is occurring and to provide an indication of the relative flow volume. The bypass valve includes an improved pressure responsive system which is adjustable for differing line pressure conditions.

4 Claims, 4 Drawing Figures 3,967,920

HORTICULTURE SPRAYING SYSTEMS

This application is a divisional application of my copending application Ser. No. 502,074, filed Aug. 30, 1974, for "Horticulture Spraying Systems" and now U.S. Pat. No. 3,894,690.

BACKGROUND OF THE INVENTION

This invention relates to chemical spraying units, and more particularly, to horticultural chemical spraying units for mixing water and a chemical such as a fertilizer, insecticide, or the like, for horticultural uses.

More particularly, the present invention contemplates the provision of a pressure controlled automatic bypass system in connection with water and chemical supply units which is responsive to the pressure generated by opening and closing of the discharge nozzle for selectively bypassing water and chemicals from an input to the discharge nozzle to the respective supply tanks. In addition, means are provided for automatic metering of the chemical output and for providing indications of the occurrence of flow as well as the volumetric flow.

Prior art devices for mixing liquid and chemicals typically include mechanically interconnected linkages and systems which are not easily adjustable nor particularly reliable in operation. In the present invention, a hydraulically controlled bypass valve eliminates the problems created with mechanical devices and produces a quicker response time and function. It also prevents any intermixing of liquids, provides full control of both liquids and has a fail-safe feature described herein.

The present system is designed for use by professional landscape horticulturists in applying treatments of varied nature to plants. These treatments are commonly water dispersions of insecticides or fungicides sprayed on the foliage of trees, shrubs, and lawns; and dissolved fertilizer materials in water which are injected into the soil or sprayed on a lawn.

The needs of plants are somewhat diverse so that several different mixtures are sometimes needed in a normal day's work. Commercial sprayers now available for these purposes fail to meet the landscape horticulturists' need in several respects.

In the present system, two pumps, respectively for chemicals and water, are positive displacement, piston types and are chain driven together by a governor controlled gasoline engine. The chain drive ratio between pumps is calculated to produce an output ratio of one part chemical material to four parts water by volume. The chemical mixes in the multiple tanks contain the ratio necessary to mix 4 parts of water to 1 part of chemical.

SUMMARY OF THE INVENTION

The present invention is embodied in a system which includes a water supply tank means and a first pump means to supply water from the tank means to a mixing chamber. A chemical supply tank means and a second pump means are provided to supply chemical from the tank means to a mixing chamber. The mixing chamber is coupled to an outlet hose which has a spray nozzle. One-way check valves are disposed between a pump and the mixing chamber to prevent back pressure or flow to the pumps. Each of the pumps has a bypass conduit to the respective tank. Each bypass conduit has parallel conduit sections which respectively contain a manual valve and an automatic valve. The automatic controlled bypass valves are part of a single unit and are operated by a control valve. The control valve is responsive to the pressure in the outlet hose to open the bypass valves when the spray nozzle is closed and to close the bypass valves when the spray nozzle is opened. The control valve accomplishes this function by the differential pressure between the hose pressure and the pump pressure and the preset force of a spring normally closing the control valve. A bell system is attached to the chemical pump hose and provides a repetitive sound as a function of the speed of the pump and the event of fluid flowing from the outlet nozzle. The bell is operated once for each full rotation of a timer gear. The timer gear is incrementally advanced by a timer member attached to the pump shaft. The timer member is clutched to the pump shaft by inflation of the chemical hose and declutched or braked by deflation of the chemical hose.

DETAILED DESCRIPTION OF THE PRESENT INVENTION

Figure 1:
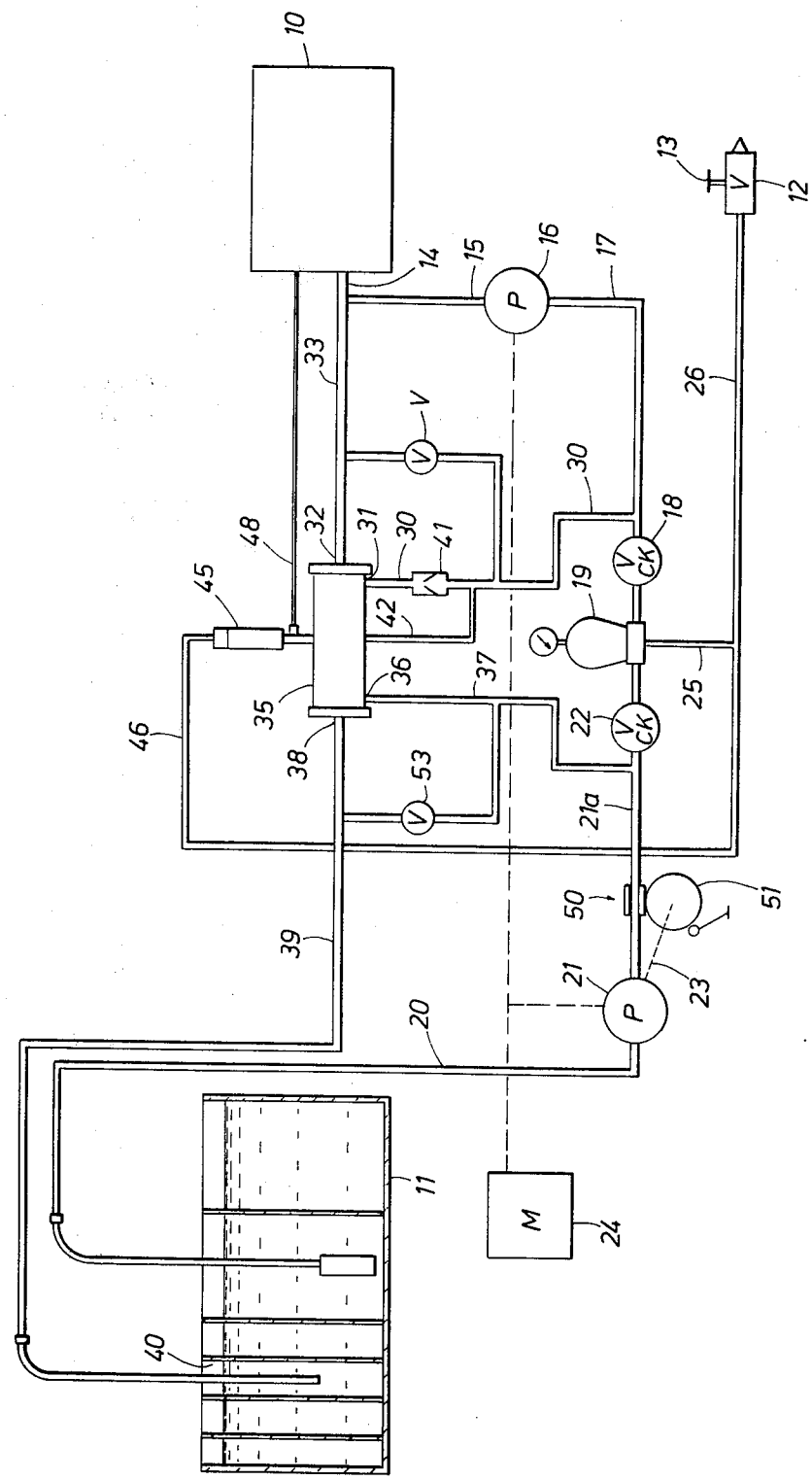
FIG. 1 is a schematic representation of the general organization of the spraying system embodying the present invention.

Referring now to FIG. 1, the system of the present invention includes a water storage and supply tank 10, a chemical storage and supply tank 11, and a discharge nozzle 12 from which a mixture of water and chemicals from the respective tanks is discharged. The water and chemicals are separately supplied to a mixing chamber 19 which connects to the nozzle 12. The discharge nozzle 12 is conventional in construction and includes a trigger 13 or other mechanism for selectively opening and closing a valve in the nozzle 12 and controlling the flow of liquids therefrom.

The water is supplied to the mixing chamber 19 from the water tank 10 via a tank pipe outlet 14, a conduit or pipe 15, a pump 16, another conduit or pipe 17, and a check valve 18. The pump 16 is a positive displacement type hydraulic pump, for example a Smith Company constant volume pump which delivers about 20 gallons of liquid per minute. The pump 16 functions to deliver water from the tank 11 to the mixing chamber 19 in a predetermined volumetric quantity in proportion to rotation of its driving shaft. The check valve 18 operates to permit flow in one direction only (toward the chamber 19) so that a back flow or back pressure does not occur in the portion of the conduit 17 which connects to the pump outlet.

The chemicals in the tank 11 are supplied to the mixing chamber 19 by means of a suction hose or pipe 20, a pump 21, another conduit or pipe 21a, and a check valve 22. The pump 21 is a positive displacement type hydraulic pump, for example, a John Bean constant volume pump which delivers about 5 gallons of liquid per minute. The pump 21 functions to provide a metered flow of chemicals in proportion to rotation of its driving shaft. The one-way check valve 22 in the flow conduit 21a similarly prevents the backflow of fluids and pressures to the pump 21. Both of the pumps 16 and 21 are connected to a common driving shaft 23 (shown in dashed line) and to a common driving motor 24. Thus, the pumps 16 and 21 have a proportionately related volumetric pumping function of the liquids from the tanks to the mixing chamber 19. The mixing chamber 19 is a hollow chamber sufficient to accommodate natural expansion which may occur and has an outlet conduit or pipe 25 connected via a flexible hose 26 to the mixing discharge nozzle 12. It will be appreciated when the discharge nozzle 12 is opened that the pumps 16 and 21 will deliver liquids from the tanks via the check valves 18 and 22 and the mixing chamber 19 to the discharge nozzle 12 and the fluid will be sprayed from the nozzle 12 in accordance with the pressure developed by the pumps.

When the discharge nozzle 12 is closed and the flow of fluid is stopped, it is desirable to bypass the fluid from the pumps to a storage tank or to recycle the fluid. To this end, a bypass conduit or pipe 30 is connected to the conduit 17 between the check valve 18 and the water pump 16 and extends to a first flow inlet 31 of a pressure controlled bypass valve 35. The first flow outlet 32 of the bypass valve 35 is coupled via a conduit or pipe 33 to the tank outlet 14 which is also connected to the input pump 16. When the first flow inlet 31 and first flow outlet 32 of the bypass valve 35 are placed into communication by operation of the valve 35, water is recirculated by the pump via conduits 17, 30, 33 and 15.

The bypass valve 35 essentially consists of two independent bypass valve structures which are either opened or closed. The second of the bypass valve structures has its flow inlet 36 connected via a conduit or pipe 37 to the output conduit 21a between the pump 21 and the check valve 22. The second flow outlet 38 is connected via a hose or conduit 39 back to a supply chamber 40 in the chemical tank 11. While the suction hose 20 and bypass hose 39 are illustrated in position in separate tanks, it will be appreciated that when the second flow inlet 36 and second flow outlet 38 are placed into communication by the bypass valve means 35, chemicals from the pump 21 are bypassed to the tank compartment 40. The bypass valve elements in the bypass valve 35 are controlled by the pressure in the flexible hose 26 to the discharge nozzle.

As illustrated in FIG. 1, the bypass conduit 30 to the first inlet 31 of the bypass valve is provided with a restricted flow orifice 41. A control conduit or pipe 42 extends between a central location on the bypass valve 35 and a location on the conduit 30 between the pump 16 and the flow orifice 41. The effect of the flow orifice 41 is to generate, when the liquid is flowing, a differential pressure between the flow conduit 42 and the flow inlet 31 to maintain the bypass valve 35 in a closed condition whenever the nozzle 12 is open. The bypass valve 35 is responsive to the control pressure in the outlet hose 26 and the differential pressure between the conduit 42 and the flow inlet 31.

A control valve 45 is provided to regulate the operation of the bypass valve. The control valve 45 has an input pipe or conduit 46 from the output hose 26, an input conduit or pipe 47 from the central section of the bypass valve 35 and an output conduit or pipe 48 to the water tank 10. When the nozzle 12 is open, the reduced pressure to the control valve 45 maintains the valve elements of the bypass valve 35 in a closed position.

When the nozzle 12 is closed, the full pressure from pump 16 operates the control valve 45 which, in turn, permits the valve elements in the bypass valve 35 to open. During the operation of the system, whenever the nozzle valve 12 is closed, the water from pump 16 can be recirculated continuously and maintained in the system for discharge from the nozzle 12. This feature prevents the unexpected and undesirable possibility of spraying raw or undiluted chemicals from the nozzle 12. On the other hand, the chemicals are returned to the same or a different compartment in the chemical storage tank 11 so they do not recycle but are remixed in solution. The tank 11, as illustrated, can have separate compartments for handling a variety of different chemicals. To interchange chemicals for spraying purposes, it is only necessary to change the input hose to a different compartment.

Coupled to the output conduit 21a (which is flexible) for the pump 21 is a pressure responsive system 50 which is operated by virtue of pressure within the chemical conduit 21a and, when operated, is responsive to rotation of the pump shafts 23 to operate an audible alarm bell 51 which signals that 1) the nozzle 12 is opened and the bypass valve 35 is closed, 2) that by the repetition rate of the bell sounds, the rate of the fluid being pumped is quantitatively determinable, and 3) that in the absence of sound, no fluid under pressure is being supplied by the conduit 21a.

In addition to the bypass valve 35, the first input conduit 30 and the first outlet conduit 33 of the bypass valve 35 are coupled to a manually operable bypass control valve 52 while the second input conduit 37 and the second outlet conduit 39 are connected to a manually operable bypass control valve 53. Thus, the manually operable control valves 52 and 53 can be opened to provide a return bypass passage for the liquids from the pumps independently of the operation of the bypass valve 35.

In the operation of the foregoing system, the tank 10 contains water and the compartments of the tank 11 contains various chemcals. The appropriate formula for the mixture is selected by placing the suction hose 20 into the selected tank compartment. Both manual bypass valves 52 and 53 are opened and the motor 24 started. This primes the system with liquid and the automatic bypass valve 35 is in an open condition. The manual bypass valves 52 and 53 are then closed and the automatic bypass valve first moves to a closed position because of the pressure in chamber 103 generated by the restriction 41. Pressure is quickly generated in hose 26 to cause the control valve to then open the automatic bypass valve. The automatic bypass valve 35 remains in an open condition so that both pumps are outputting fluid. When the spray nozzle 12 is opened, the bypass valve 35 goes to a closed condition and the mixture of liquids is discharged from the nozzle 12. When the spray nozzle 12 is closed, the pressure control valve 45 acts to return the bypass valve 35 to an open condition.

Figure 2:
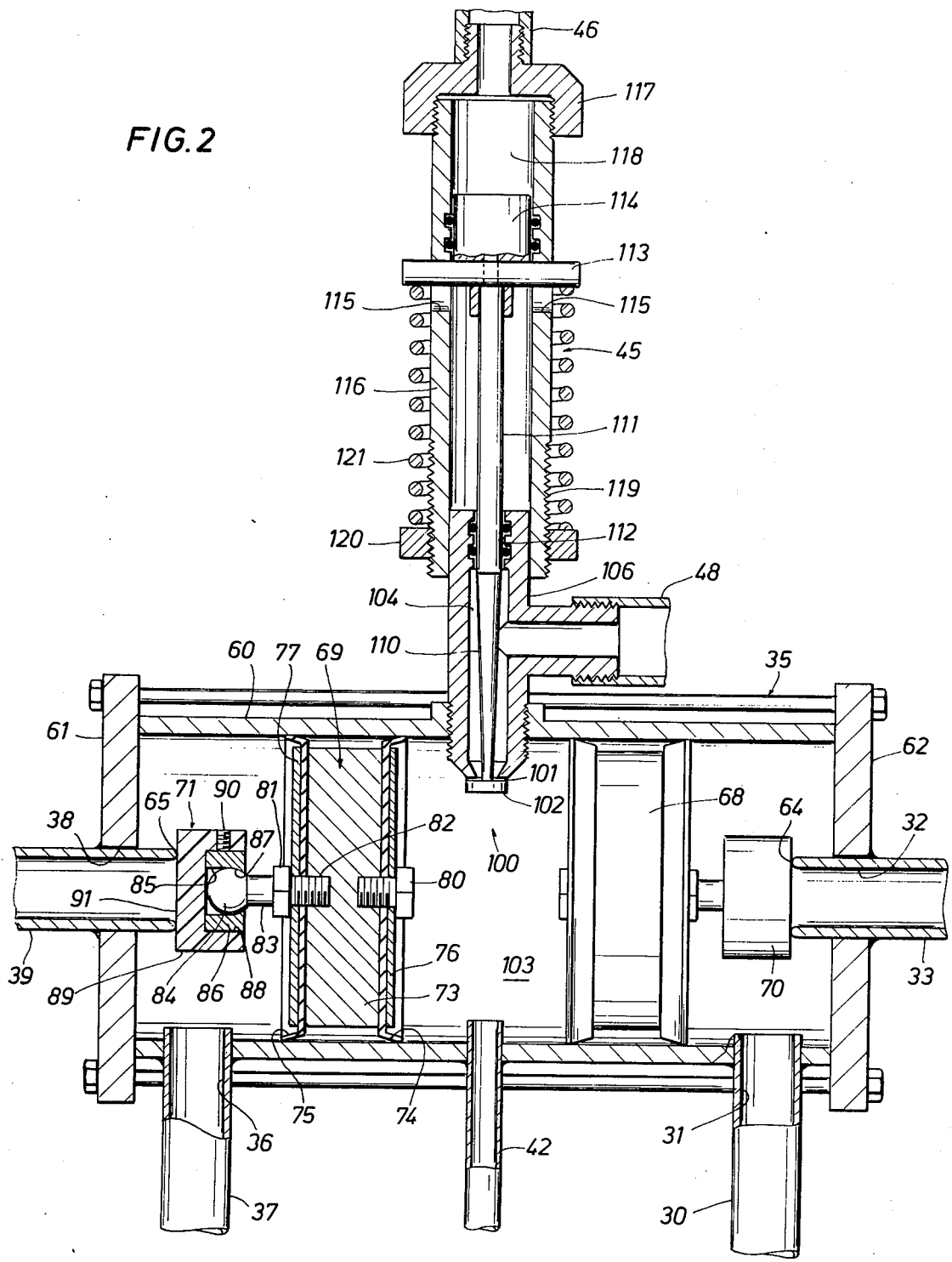
FIG. 2 is a view in cross-section through a pressure controlled bypass valve showing the structural arrangement in detail.

Referring now to FIG. 2, the bypass valve 35 and the control valve 45 therefor are shown in greater detail. The bypass valve 35 includes a generally cylindrically shaped chamber defined by a tubular member or housing 60 which has end caps 61 and 62 connected thereto in a suitable manner. Along the central axis of the tubular housing 60 and the end cap 62 is the first flow outlet 32 which receives a tubular pipe member 33. The pipe member 33 has its end 64 projecting inwardly of the end cap 62 into the interior of the tubular housing 60. The end 64 of the pipe member has rounded terminal edges to define a valve seating surface. The other end cap 61 similarly has a second flow outlet 38 which receives a tubular pipe member or conduit 39 which extends inwardly into the interior of the tubular housing 60. The end 65 of the pipe 39 has rounded edges to define a valve seating surface. A first flow inlet 31 in the side wall of the tubular member 60 receives a tubular pipe member 30 which enters through a side of the member 60 adjacent to the end cap 62. Between the center or lengthwise mid point of the tubular housing 60 and the first pipe member 30 is a first piston element 68.

The second inlet 36 is at a location at the other end of the cylinder housing 60 and a pipe 37 extends through the side wall into the interior of the housing. A second piston 69 is located between the mid point of the housing and the second inlet pipe 37. Attached to each piston 68 and 69 is a valve seating element 70 and 71, and, in the position shown, a valve seating element 70 and 71 is respectively sealingly engaged with a valve seat 64 and 65 on the respective outlet conduits 33 and 39. The pistons 68 and 69 and valve seating elements 64 and 65 are similarly constructed so that a description of one will suffice for the other.

The piston element 69 consists of a disc-like cylindrically shaped member 73 which very nearly approximates the interior diameter of the housing 60. On the forward and rearward faces of the disc member 73 are resilient cup sealing elements 74 and 75. Disc shaped elements 76 washer-elements 77 compress and attach the sealing elements 74 and 75 to the disc member 73. The washer element 76 is attached to the disc member 73 by a bolt 80 while the washer element 77 is attached to the disc member 73 by a nut 81 on a thread portion 82 of a rod member 83. The other end of the rod member 83 terminates with a ball or spherically shaped part 84 which is enlarged relative to the diameter of the rod member 83. The ball shaped part 84 is received within a cylindrical recess 85 of a retainer ring 86 which has a lip portion 87 formed by a curved surface. The lip portion 87 attaches the ball portion to the ring 86 while permitting pivotal motion of the ring 86 about the ball portion. The retainer ring is received within a cylindrically shaped recess 88 in a valve element 89 and affixed thereto by an interlocking locking screw 90. The spherically shaped ball portion 84 in the retainer ring 86 permits universal movement of the valve element 89 so that its forward face 91 can more easily adjust to and seat with respect to the seating edge 65 on the pipe 39.

In the central section of the cylinder or housing 60 there is an input pipe or conduit 42 which is connected to the outlet conduit from the pump 16. In a diametrically opposed location on the housing 69 is a valve 100 comprised of a valve seat 101 and a valve closure element 102. The valve closure element 102, when seated on the valve seat 101, closes off the interior chamber 103 in the housing located between the two pistons 68 and 69 from the flow of fluid. The pressure in the chamber 103 is the same as that in the pipe 42. When the valve element 102 is moved off of the valve seat 101, the static pressure between the two pistons is released and fluid can flow from the interior chamber 103 in the cylinder housing 60 into a flow conduit 104 in the control valve 45. The control valve 45 includes a T-shaped element 106 which is threadedly received into the side of the housing 60 with a "T" outlet pipe 107 which returns fluid to the water tank via the conduit 48. Thus, the opening and closing of the valve 100 controls the flow of fluid from the interior chamber 103 of the housing 60 to the water tank. The valve element 102 is attached by a tapered stem 110 to a cylindrically shaped polished rod 111 which is slidably and sealingly received within an opening 112 in the element 106 where the axis of the opening 112 is aligned with the axis of the opening of the valve seat 101. The rod 111 for valve element 102 extends upwardly and is connected to a crossbar or rod 113 and to an upper control piston 114. The crossbar 113 is movable in elongated diametrically located, elongated recesses 115 in a barrel or tubular member 116 which extends between an attached position on the T element 106 and an end cap 117 above the piston 114. The end cap 117 is connected to the conduit 46. The portion of the barrel member 116 between the end cap 117 and the crossbar 113 defines a hydraulic pressure chamber 118. The lower part of the barrel 116 is provided with an externally threaded portion 119 and nut 120 so that a compression spring 121 can be disposed between the nut 120 and the crossbar 113 on the control rod 111.

As illustrated in the drawings, the force of the spring 121 tends to retain the crossbar 113 in an upper position in the recesses 115 thereby engaging the valve closure element 102 with the valve seat 101. By adjusting the position of the nut 120 longitudinally along the barrel, the force of the compression spring 121 can be varied so that the force required to move the crossbar 113 downwardly to open the valve 100 can be varied. The cylinder of the chamber 118 above the crossbar 113 receives the piston 114. The cross-section or effective hydraulic area of the upper piston 114 relative to the cross-sectional effective hydraulic area of the shaft 111 within the opening 112 is such that where the pressure in the upper chamber 118 exceeds the force of the spring 121, the valve 100 is opened.

Reviewing the operation of the system, when the discharge nozzle 12 is opened, the fluid mixture is discharged and the pressure in the outlet flexible hose 26 is less than it would be when the nozzle 12 is closed. Therefore, the pressure in this upper chamber 118 of the control valve 45 is inadequate to open the valve 100. The pressure from the hydraulic pump 16 is applied to the chamber 103 between the pistons 68 and 69 while the inlet pressures in pipes 30 and 37 is applied to the bypass valve 35. Since the effective pressure areas are reduced at valve openings 64 and 65, the seating elements 70 and 71 are closed against the valve seats 64 and 65. When the discharge nozzle 12 is closed, that is, the flow of liquid is stopped, the pressure from the pump 16 is immediately transmitted to the upper chamber 118 of the control valve 45 as well as to the chamber 103 in the center section of the bypass valve 35. The difference in the effective hydraulic areas (between the diameter of chamber 118 and the diameter of opening 112) and the applied pressure in the chamber 118 is great enough to open the valve 100 thereby reducing the pressure in the chamber 103 between the two pistons 68 and 69. When this occurs, the pressure of the pump 16 and pump 21 as applied to the bypass valve 35 by conduits 30 and 37 is greater than the pressure in chamber 103 and the pistons 68 and 69 shift toward the center to open the outlet conduits 33 and 39. Thus, it will be appreciated that the opening and closing of the discharge nozzle 12 automatically opens and closes the bypass valve 35 and this operation is controlled by the automatical control pressure responsive device 45.

Figure 3:
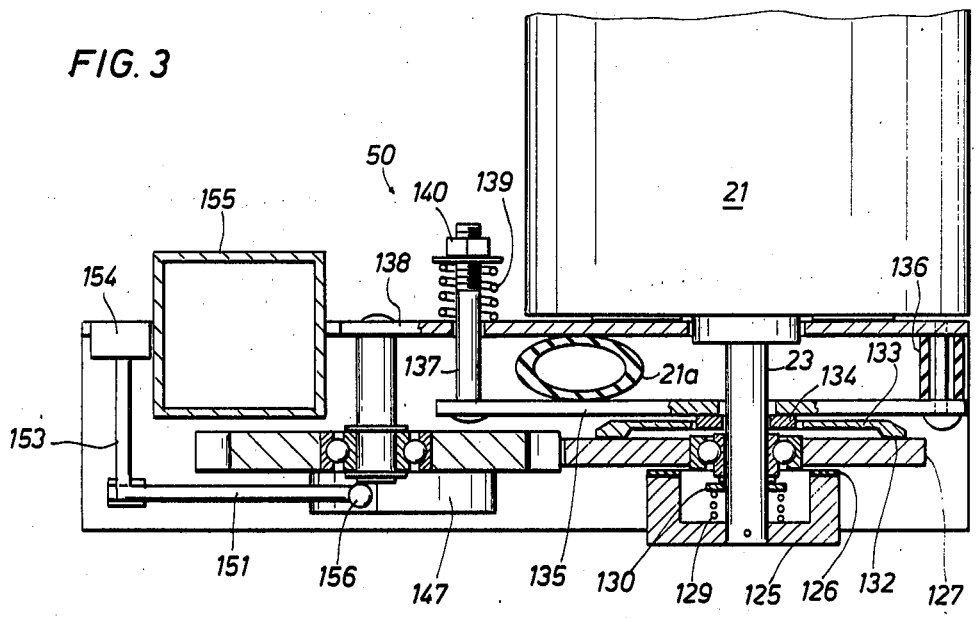
FIG. 3 is a view in cross-section of a liquid metering system for providing an audible indication of flow.
Figure 4:
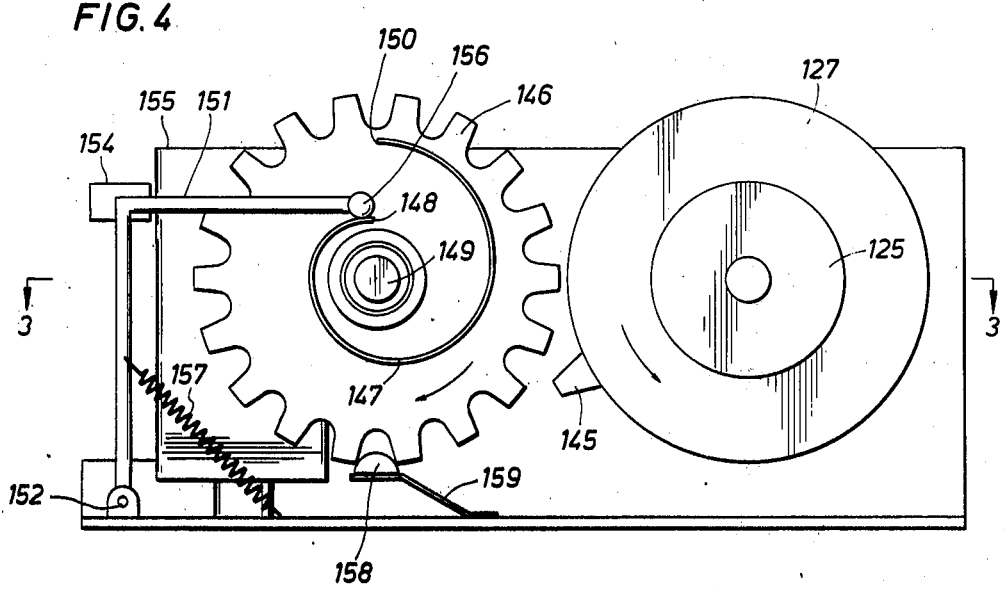
FIG. 4 is a view in side plan arrangement of the metering system illustrated in FIG. 3.

Referring now to FIGS. 3 and 4, the metering or gong system is illustrated in greater detail. As shown in FIGS. 3 and 4, the pump 21 has a shaft 23 which carries a clutch member 125 at its outer end. The clutch member 125 consists of a cylindrically shaped cap which has an inwardly facing annular clutching surface 126 disposed adjacent to a cylindrically shaped timer wheel 127. The timer wheel 127 is rotatably disposed on bearings 128 on the shaft so that it can rotate freely with respect to the shaft. The bearings 128 are also mounted on the shaft so as to be slidable axially relative to the shaft. A spring 129 is disposed about the shaft 23 between an outer pressure ring 130 and the clutch member 125. The spring 129 bears upon the pressure ring 130 adjacent to the slidable bearing 128 so as to normally urge the timer element 127 in a direction toward the pump 21 and into engagement with an outwardly facing annular braking surface 132 on a brake 133 which is supported or fixed relative to the pump 21 and normally prevents the timer element 127 from rotating.

To disengage the timer element 127 from the braking element 133 and to bring the timer element into engagement with the clutch 125, an inner pressure ring 134 is disposed between a pressure plate 135 and the bearing 128. The pressure plate 135 is an elongated member which is mounted with respect to a screw attachment on a tubular post 136 on one side of the pump 21 and a pin member 137 at a diametrical location on the pump. The pin member 137 extends through a fixed, vertical, base plate 138. A spring member 139 is disposed about the pin member 137 between a nut 140 and the vertical base plate 138 and tends to pivot the pressure plate 135 toward the face of the pump 21 with respect to the pivot post 136 which is located on the other side of the pump. Disposed between the pressure plate 135 and the base plate 138 is the chemical flexible flow hose 21a. The spacing between the plate members 135 and 138 is made such that when there is no fluid flowing, or the pressure is reduced, within the flexible hose 21a that the spring member 139 tends to urge the plate members 135 and 138 toward one another and make the cross-section of the hose 21a oblong or ovular.

When the pump 21 is operated and the hose 21a contains liquid under pressure, it will assume a circular or cylindrically shaped configuration and, in so doing, the pivotal plate 135 will be moved outwardly with respect to the pump 21 so that the ring member 134 moves the bearings 128 and timing element 127 from engagement with the brake surface 132 and into engagement with the clutch surface 126. When the timing element 127 is brought into engagement with the clutch surface 126, the element 127 is rotated in synchronism with the rotation of the shaft.

The timing element 127 as shown more particularly in FIG. 4, is a cylindrically shaped member with a single tooth 145 on its periphery. Spaced therefrom, along a parallel axis, is a gear member 146 which is mounted for rotation. The engagement of the tooth member 145 with the gear member 146 will cause the gear member 146 to rotate an increment each time it is engaged by the tooth 145. Thus, if there are 36 spaces in the gear element 146, the gear element 146 will rotate once for each 36 revolutions of the timing element 127. Mounted the outer forward surface of the gear element 146 is a convoluted leaf element 147 which, as shown in FIG. 4, spirals outwardly from a 0° position at one diametrical location 148 relative from central axis 149 to a terminal end at a second diametrical location 150 relative to the central surface of the gear element 146 and is more or less "L" shaped and has an end 152 pivotally attached to the base. Extending transversely to the follower element 151 to a pin 153 (FIG. 3) to which a hammer element 154 is attached and the hammer element 154 is disposed adjacent to a bell 155. As the geared tooth element 146 is incrementally rotated, the follower end 156 of the follower 151 is moved along the outer surface of the convoluted guide element 147 so that the hammer 154 is separated from the bell 155 and a spring 157 attached to the follower element 151 is placed under tension. At the point where a full 360° rotation has occured for the gear element 146, the follower element 151 is released by passing the follower end 156 over the outer edge 150 of the guide element 147 and, upon release of the follower element 151, the spring 157 brings the hammer 154 into engagement with the bell 155. To prevent backlash or disengagement of the gear element 146 relative to the tooth element 145, a ratchet finger 158 is disposed on the base and is brought into engagement with the tooth element by a spring element 159. Thus, the position of the gear element 146 is maintained fixed each time it rotates.

It will be appreciated that while a gearing system on parallel axes is illustrated, a worm gear system on transverse axes in the manner of a level wind can be used to operate the bell.

The various components of the system particularly those in contact with chemicals are preferably constructed from corrosion resistant materials such as stainless steel. The use of a suction hose in the chemical tank affords the opportunity to visually monitor or check the functioning of the system and to pump fluid from one tank to another. It is particularly noteworthy that this system is failsafe against pumping chemicals only from the nozzle as the absence of water pressure maintains the bypass valve 35 in an open condition.

While particular embodiments of the present invention have been shown and described, it is apparent that changes and modifications may be made without departing from this invention in its broader aspects; and therefore, the aim in the appended claims is to cover all such changes and modifications as fall within the true spirit and scope of this invention.

I claim:

1. Apparatus for metering the supply of liquid from a supply tank and pump means, comprising
    pump means for discharging a fluid through an outlet conduit, said outlet conduit having a flexible section and said pump having a shaft rotatable in proportion to liquid flow through the pump,
    means for timing the rotation of said shaft including a timing element rotatively supported on said pump shaft,
    means responsive to pressure in said flexible section for selectively coupling said timing element to said pump shaft, and
    means responsive to rotation of said timing element for producing an indication of pressure existant in said flexible section.

2. The apparatus as defined in claim 1 wherein said timing element is slidably mounted on said pump shaft, brake means disposed to one side of said timing element, clutch means disposed on the opposite side of said timing element, resilient means disposed between said clutch means and timing element for normally urging said timing element into engagement with said brake means, said timing element being movable in response to inflation of said flexible section to disengage from said brake means and into engagement with said clutch means.

3. The apparatus as defined in claim 2 wherein said selective coupling means includes a pivotally mounted plate member engageable on one side with said timing element and on the other side with said flexible section, and means for resiliently urging said plate member toward a position deflating said flexible section.

4. The apparatus as defined in claim 2 and further including means responsive to said timing element for producing a striking motion in proportion to the rotation of said timing element, and bell means for responding audibly to said striking motion.

* * * * *